(12) United States Patent
Amamori

(10) Patent No.: US 6,193,269 B1
(45) Date of Patent: Feb. 27, 2001

(54) AIRBAG MOUNTING STRUCTURE OF AIRBAG DEVICE

(75) Inventor: Ichiro Amamori, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/301,613

(22) Filed: Apr. 29, 1999

(30) Foreign Application Priority Data

May 13, 1998 (JP) .................................................. 10-130342
Apr. 8, 1999 (JP) .................................................. 11-101504

(51) Int. Cl.[7] .................................................. B60R 21/16
(52) U.S. Cl. ........................................ 280/728.2; 280/732
(58) Field of Search ................................. 280/728.2, 732

(56) References Cited

U.S. PATENT DOCUMENTS 4,153,273 * 5/1979 Risko ..................................... 280/732
5,487,556 * 1/1996 Jenkins et al. ..................... 280/728.2
5,566,972 * 10/1996 Yoshida et al. ................... 280/728.2
5,788,266 * 8/1998 Rose et al. ......................... 280/728.2
5,857,696 * 1/1999 Inoue et al. ....................... 280/728.2

FOREIGN PATENT DOCUMENTS 9-123866   5/1997   (JP) .
9-290702   11/1997  (JP) .

* cited by examiner

*Primary Examiner*—Kenneth R. Rice
(74) *Attorney, Agent, or Firm*—Kanesaka & Takeuchi

(57) ABSTRACT

An airbag mounting structure allows an airbag to be easily mounted to a retainer and provides reduced stress exerted onto the retainer during the inflation of the airbag. The retainer is provided with a protrusion and the concavities in the bottom thereof. An inner plate which is disposed inside the airbag has a downward projection. A portion between slits of the airbag is pressed into the protrusion by the downward projection. An inflator is inserted into the protrusion from a side end of the retainer and the both ends of the inflator are engaged with concavities.

10 Claims, 8 Drawing Sheets

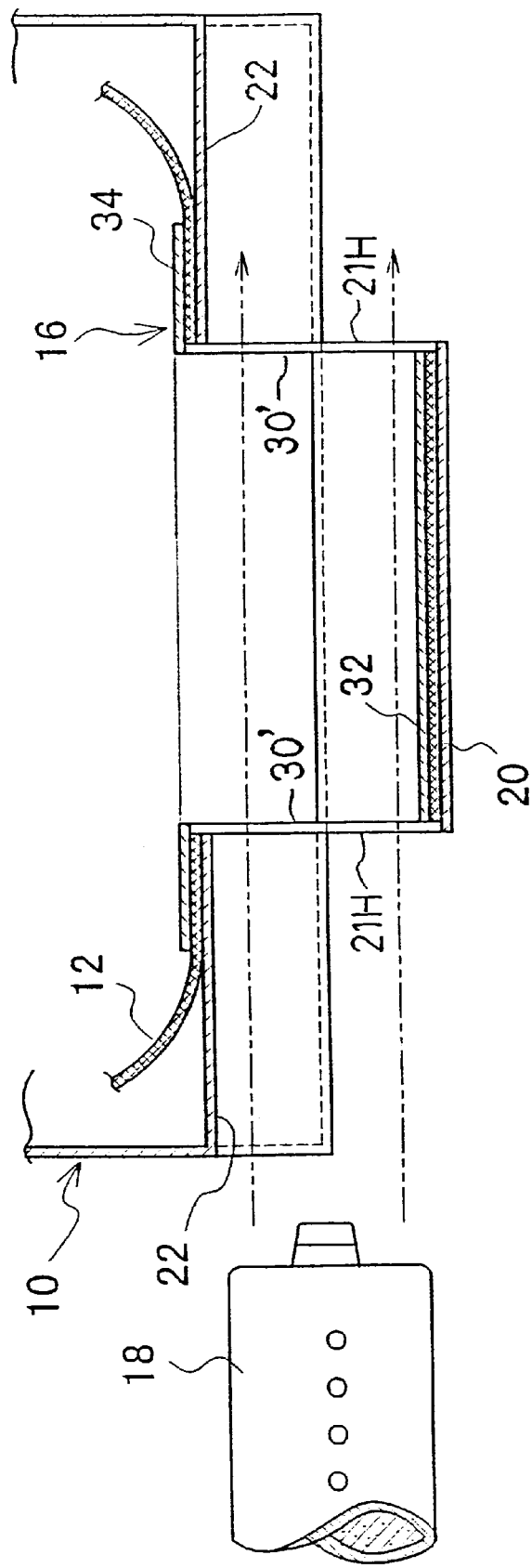

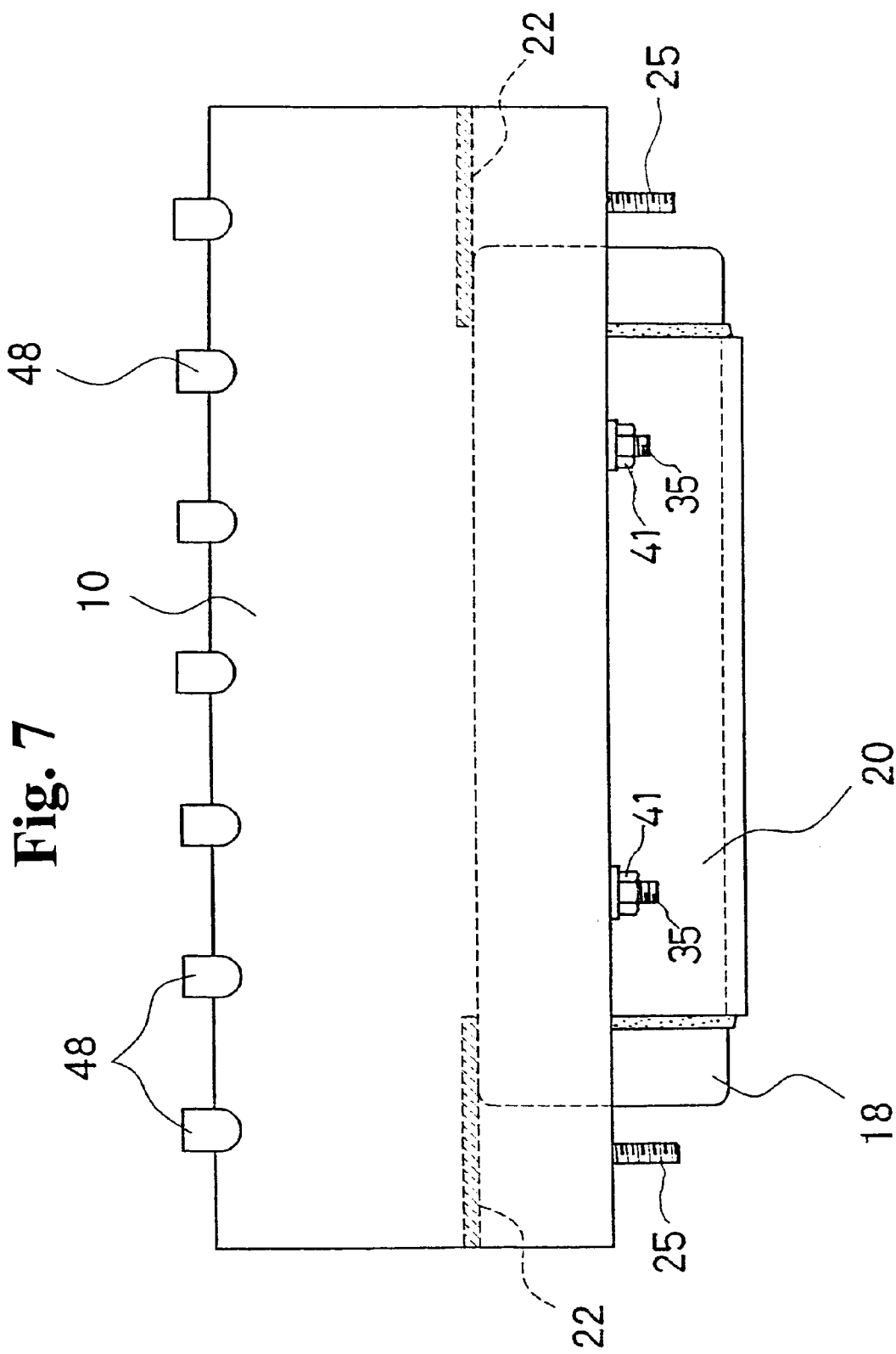

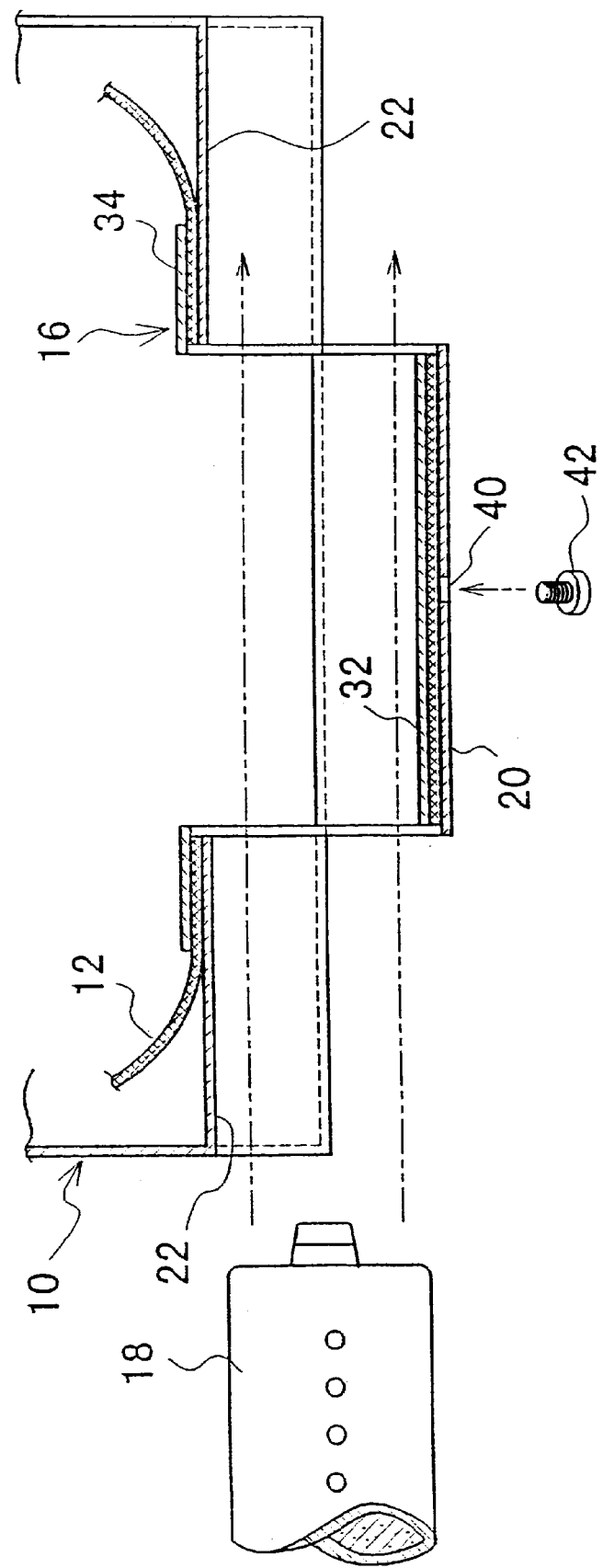

AIRBAG MOUNTING STRUCTURE OF AIRBAG DEVICE

BACKGROUND OF THE INVENTION AND RELATED ART STATEMENT

The present invention relates to an airbag mounting structure of an airbag device installed in a conveyance such as a vehicle and an aircraft and, more particularly, to the airbag mounting structure in which an inflator disposed inside an airbag is fixed to a retainer together with the airbag.

Japanese patent publications 9-123866 and 9-290702 disclose airbag devices having an airbag mounting structure where an inflator is inserted in the airbag, stud bolts integrated with the inflator are projected out of the airbag through small holes formed in the airbag and the stud bolts are fastened to a frame with nuts, thereby fixing the inflator and the airbag to the frame at one time. The airbag device of 9-123866 has rings with the stud bolts which are secured to the inflator by press-fitting, whereby the stud bolts are integrated with the inflator. The device of 9-290702 has a cylindrical cover provided with the stud bolts, and the cover is integrated with the inflator by press-fitting.

In the conventional airbag mounting structures mentioned above, since the ring or the cover is secured to the inflator, the weight of the inflator is increased for the ring or the cover. Since the inflator and the airbag are fixed with the two bolts, it takes much time for alignment of the bolts to the bolt holes. In addition, since two nuts are required to be screwed, it takes much time for assembly of the airbag device.

OBJECT AND SUMMARY OF THE INVENTION

The object of the present invention is to solve problems of the prior art and to provide an airbag mounting structure of an airbag device which facilitates to fix the airbag and the inflator without increasing weight of the airbag device.

An airbag mounting structure of the present invention comprises a retainer having a protrusion formed in the bottom thereof and protruding outward, an airbag having a portion inserted into the protrusion; and a rod-shaped inflator which is inserted into the portion of the airbag positioned inside the protrusion. The protrusion extends in the longitudinal direction of the inflator and is provided with an inflator-through hole in at least one of the ends thereof of the longitudinal direction, through which the inflator is inserted. The airbag is provided with at least one opening confronting the inflator-through hole, through which the inflator is inserted. The end of the inflator, which is inserted through the inflator-through hole and projects outside the protrusion, is engaged with the outside of the bottom of the retainer. The airbag is clamped between the inner surface of the protrusion and the outer surface of the inflator.

According to the airbag mounting structure, a portion of the airbag extends behind the inflator, thereby securing the airbag to the retainer. At least one of the ends of the inflator is engaged with a bottom portion of the retainer. When the inflator is actuated to inflate the airbag, the airbag is held to the retainer through the inflator. Stress exerted on the retainer from the airbag through the inflator can be dispersed to wider areas of the retainer through the inflator.

In the airbag mounting structure, the end of the inflator is inserted into the airbag through the inflator-through hole and the opening of the airbag in the protrusion, whereby the inflator and the airbag are fixed to the retainer. The end of the inflator is engaged with the bottom portion of the retainer. Therefore, according to the present invention, bolts for connecting the inflator to the retainer can be eliminated, thereby facilitating the mounting work of the inflator and the airbag.

In an aspect of the present invention, the inflator has a substantially cylindrical configuration and the protrusion has a half-cylindrical configuration, the retainer has at least one concavity which is formed in the bottom thereof and is curved inwardly in a half-circle configuration which is coaxial with the protrusion, the concavity extends to a side face of the retainer, and the end of the inflator is engaged with the concavity. This structure allows load exerted on the retainer from the inflator to be received by the surface of the concavity of the retainer, thereby improving the bearing force of the retainer.

In another aspect of the present invention, an inner plate lies between the portion of the airbag corresponding to the protrusion and the outer surface of the inflator. This structure can reduce heat transferred from the inflator to the airbag when the inflator is actuated.

The inner plate has a projection curved along the outer surface of the inflator and a flange continuously extending from the projection in a direction apart from the inflator and the airbag may be clamped between the flange and the retainer. The flange may be provided with bolts and the bolts may be inserted through the airbag and the bottom of the retainer and may be fastened with nuts.

BRIEF DESCRIPTION OF THE DRAWINGS

FIG. 6 is a sectional view illustrating a state where the inflator is inserted to a retainer;

FIG. 7 is a side view of the passenger airbag device in which the airbag mounting structure according to the embodiment is provided; and FIG. 8 is a sectional view similar to FIG. 6, but illustrating another embodiment.

DETAILED DESCRIPTION OF PREFERRED EMBODIMENTS

Figure 1:
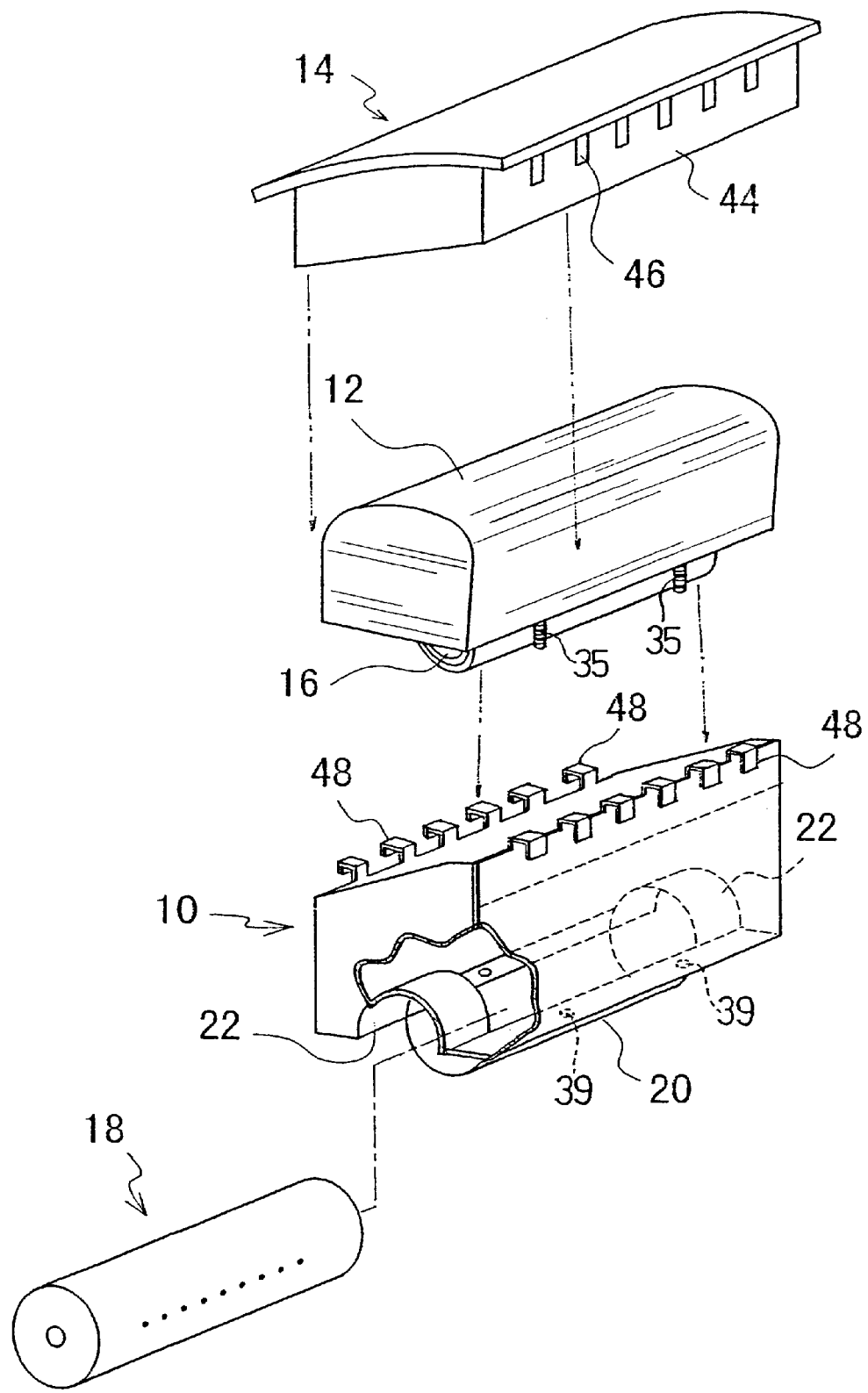
FIG. 1 is an exploded perspective view of a passenger airbag device which employs an airbag mounting structure according to an embodiment.

Hereinafter, embodiments of the present invention will be described with reference to the attached drawings. FIGS. 1 through 7 show an airbag device for a front passenger seat (hereinafter, referred to as "passenger airbag device") which employs an airbag mounting structure according to a first preferred embodiment of the present invention. To clarify the drawing, the illustration of a lid is omitted from FIG. 7.

The passenger airbag device comprises a retainer 10, an airbag 12 which is disposed in the retainer 10 in the folded state, a lid 14 covering a front-side opening of the retainer 10, an inner plate 16 which is disposed in the airbag 12, and a cylindrical inflator 18 for generating gas for inflating the airbag 12. The inflator 12 also has a function of connecting the airbag 12 to the retainer 10.

The retainer 10 has an opening on the top in FIG. 1 and a protrusion 20 on the bottom thereof which protrudes in a half-circle shape. The half-circle of the protrusion 20 is formed to fit the outer surface of the inflator 18. The protrusion 20 is disposed on the center portion of the bottom of the retainer 10. The retainer 10 is also provided with concavities 22, 22 which are formed in circular shape toward the inside of the retainer 10 on both end sides of the protrusion 20 of the longitudinal direction.

Figure 2:
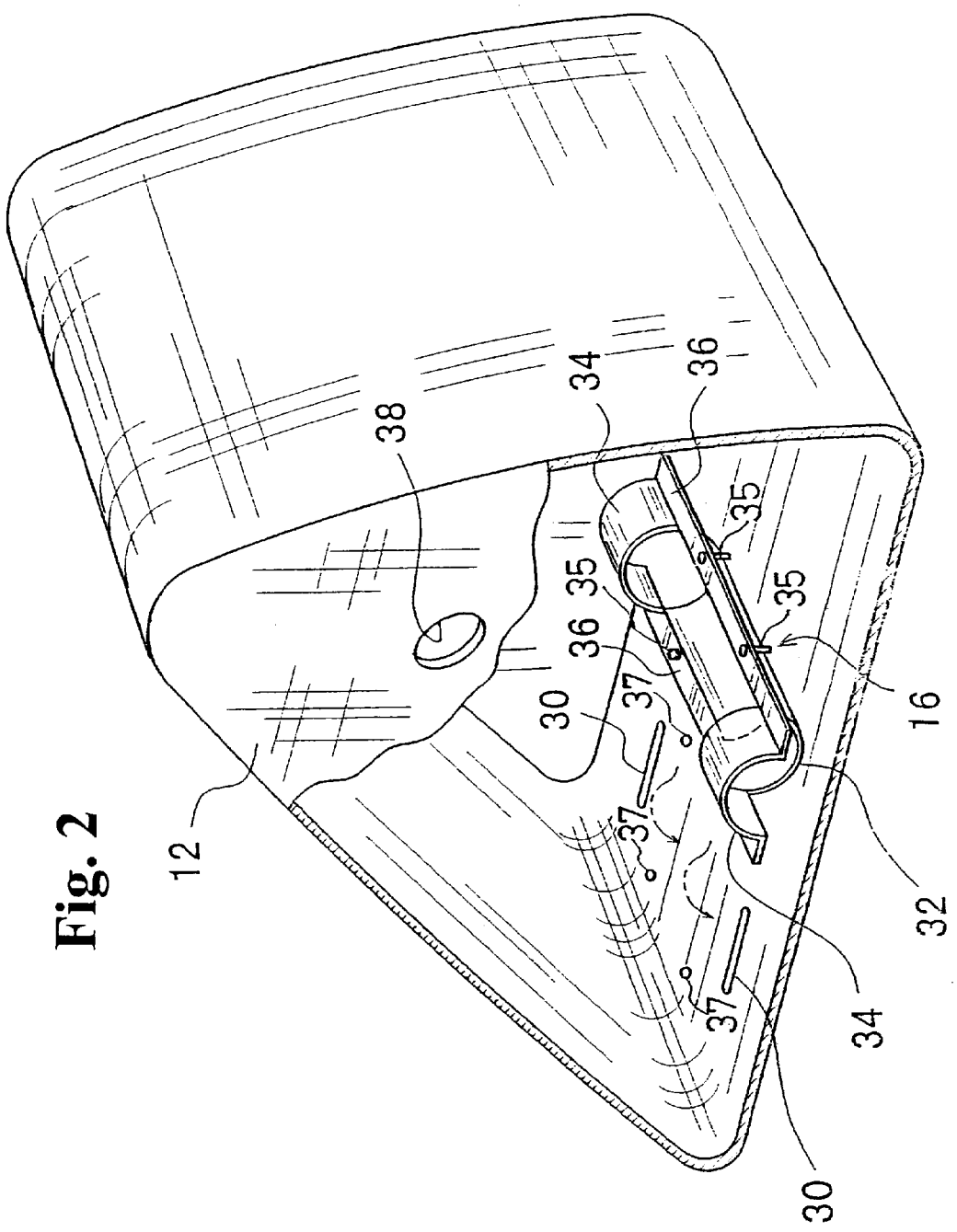
FIG. 2 is a perspective view showing relationship between an airbag and an inner plate.

The airbag 12 is provided with a pair of slits 30, 30 as shown in FIG. 2. A downward projection 32 of the inner plate 16 is depressed onto a portion between the slits 30 and 30. The inner plate 16 is made of a piece of plate. After a pair of slits are formed in the plate, a portion between the slits is pressed downwardly to make the portion to project in a half circle to form the downward projection 32, and portions on both end sides of the downward projection 32 of the longitudinal direction are pressed upwardly to make the portions to project in a half circle to form upward projections 34, 34. The inner plate 16 has flanges 36, 36 on the both sides thereof of the longitudinal direction. Fixed to the flanges 36 are bolts 35.

The airbag 12 and the retainer 10 are provided with holes 37, 39 through which the bolts are inserted.

Figure 3:
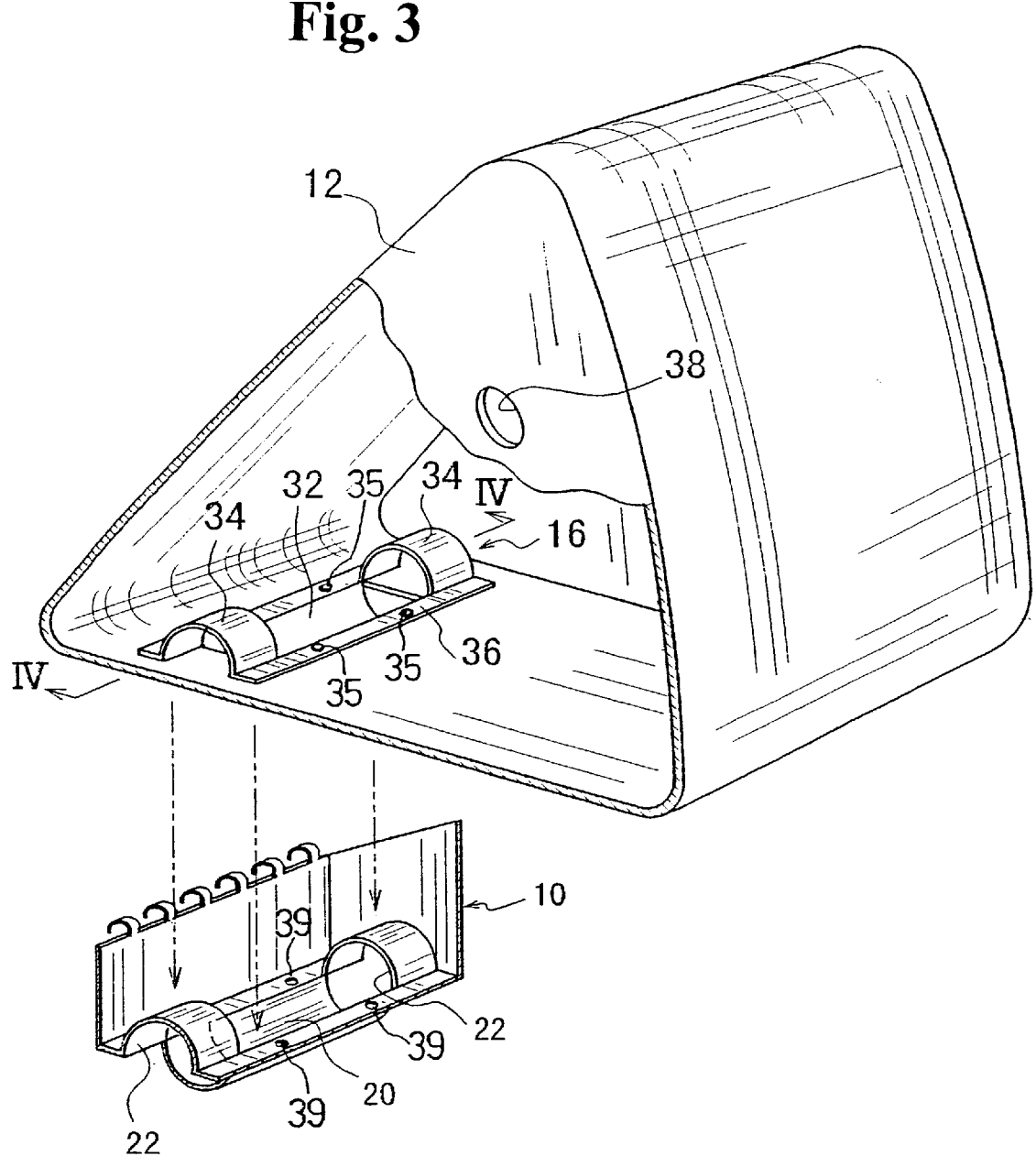
FIG. 3 is a perspective view showing relationship among the inner plate, the airbag, and a retainer.

The length of the downward projection 32 along the longitudinal direction is substantially the same as a distance between the slits 30 and 30 formed in the airbag 12. By pressing the downward projection 32 onto the portion between the slits 30 and 30, the downward projection 32 makes the portion between the slits 30 and 30 to protrude outside the airbag in a circle shape as shown in FIG. 3.

The inner plate 16 is inserted into the airbag 12 in the process of the sewing of the airbag 12 so that the inner plate 16 is in the airbag 12 at a stage where the sewing of the airbag 12 is completed. Numeral 38 in FIG. 2 designates a vent hole formed in the airbag 12.

Figure 4:
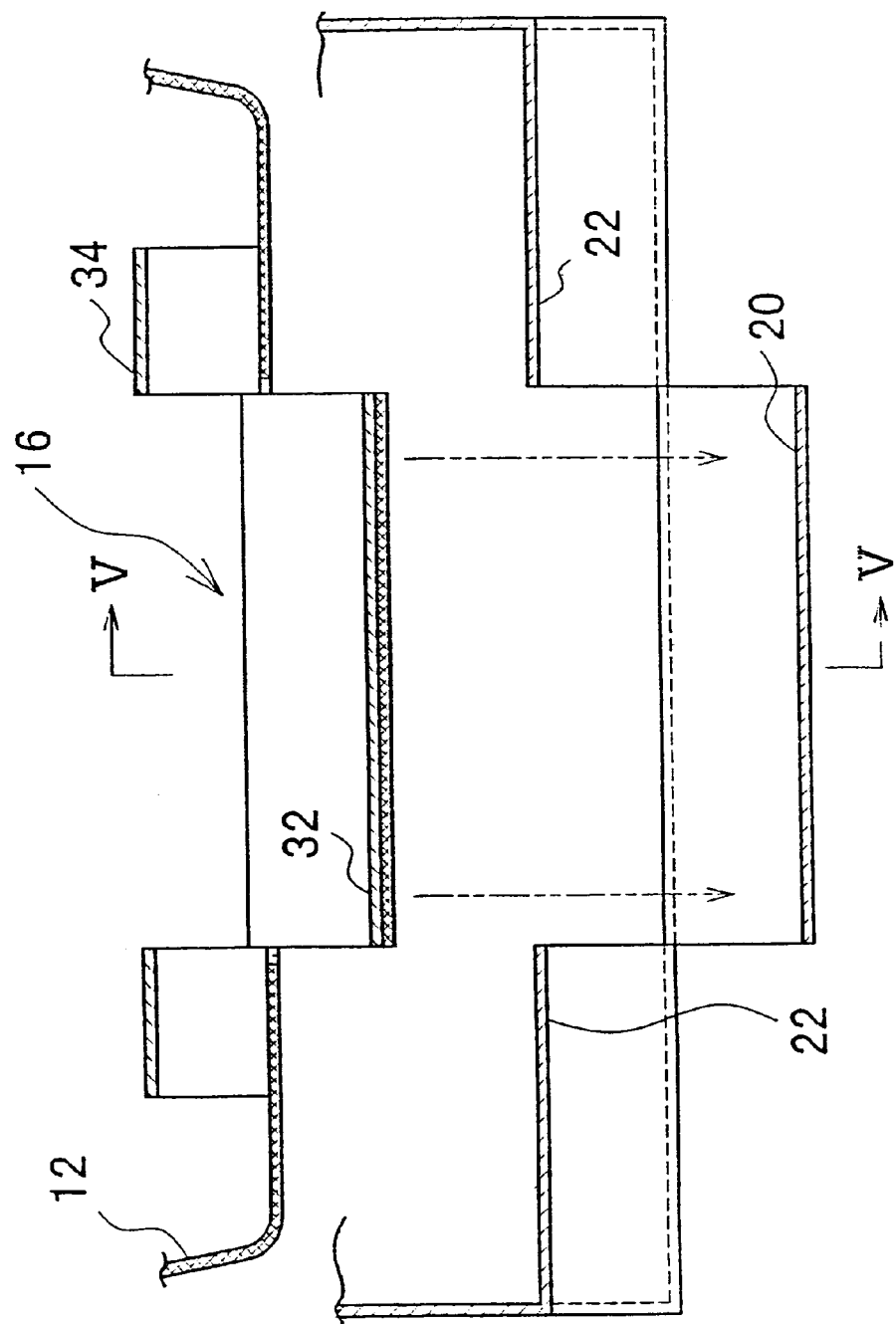
FIG. 4 is a sectional view taken along line IV—IV of FIG. 3.
Figure 5:
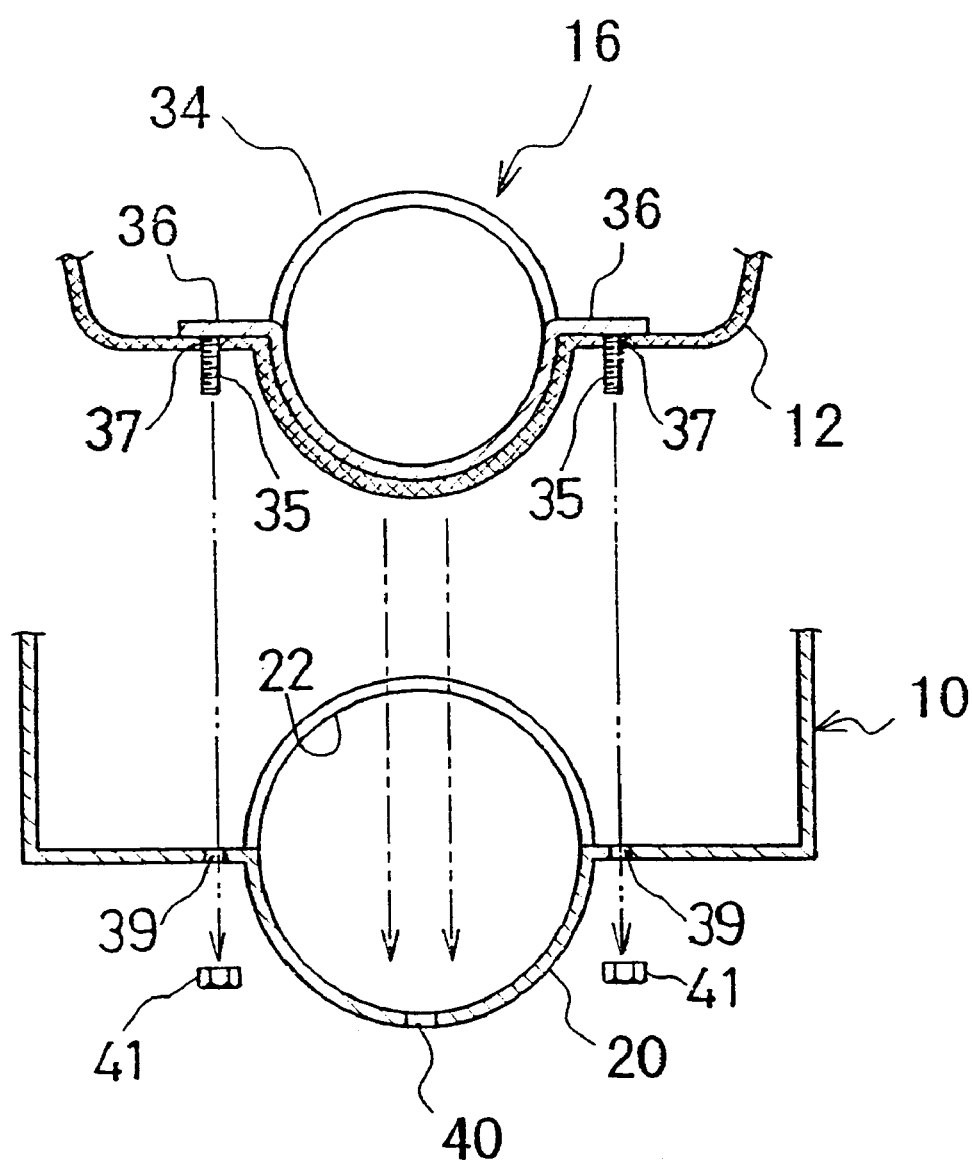
FIG. 5 is a sectional view taken along line V—V of FIG. 4.

The portion between the slits 30 and 30 of the airbag 12 protrudes outward by pressing the downward projection 32 of the inner plate 16 onto the portion of the airbag 12. The protruding portion of the airbag 12 and the downward projection 32 are inserted into the protrusion 20 of the retainer 10. Portions of the airbag 12 corresponding to the upward projections 34, 34 are pressed onto the upper surfaces of the concavities 22, 22 of the retainer 10. As shown in FIG. 4 and FIG. 5, the flanges 36, 36 of the inner plate 16 are superposed on bottom portions of the retainer 10 so that portions of the airbag 12 are clamped between the bottom portions and the flanges 36, 36. The bolts 35 are inserted through the holes 37, 39 and nuts 41 are screwed up onto the bolts 35, whereby the airbag 12 is securely clamped between the flanges 36, 36 and the retainer 10.

After the inner plate 16, the airbag 12 and the retainer 10 are engaged and the nuts 41 are screwed up onto the bolts 45 inserted through the holes 37, 39 as mentioned above, the inflator 18 is inserted into the inside of the downward projection 32 of the inner plate 16 in the protrusion 20 through a left inflator-through hole (a hole for inserting the inflator) 21H of the protrusion 20. Then, the right end of the inflator 18 is engaged with the right concavity 22 through a right inflator-through hole 21H and the left end of the inflator 18 is engaged with the left concavity 22. Therefore, the inflator 18 is fixed to the retainer 10 and the airbag 12 is connected to the retainer 10 because the portion of the airbag 12 extends beneath the inflator 18.

The lid 14 is attached to the upper opening of the retainer 10. The lid 14 has a standing wall 44 extending backward. By engaging hooks 48 projecting from the retainer 10 with hook engaging holes 46 formed in the standing wall 44, the lid 14 is attached to the retainer 10.

As mentioned above, the portion between the slits 30 and 30 of the airbag 12 is positioned beneath the inflator 18, whereby the airbag 12 is connected to the retainer 10. The inflator 18 is engaged with the retainer 10 at the both ends thereof by the concavities 22, 22 formed in the bottom of the retainer 10. When the inflator 18 is actuated to inflate the airbag 12, stress exerted on the retainer 10 from the airbag through the inflator 18 can be dispersed onto wide areas of the concavities 22, 22, thereby improving the bearing force of the retainer 10.

The concavities 22 are curved to have substantially the same radius of curvature of the outer periphery of the inflator 18, whereby stress exerted on the concavities 22 from the inflator 18 can be dispersed onto extremely wide areas. This can extremely improve the bearing force of the retainer 10.

The structure mentioned above eliminates the requirement of special parts such as rings for connecting the inflator 18 to the retainer, thereby lightening the weight of the airbag device. Since the engagement between the inflator 18 and the retainer 10 is accomplished by inserting the inflator 18 into the protrusion 20 from the side end of the retainer 10 as mentioned above, the assembly of the airbag device is quite easy.

Because the inner plate 16 disposed inside the airbag 12 is clamped between the inflator 18 and the portions of the airbag 12 extending along the protrusion 20, the airbag can be protected from heat generated when the inflator 18 is actuated. The airbag 12 is clamped between the flanges 36 of the inner plate 16 and the retainer 10 and the flange 26 is fixed to the retainer 10 by the bolts 35, thereby facilitating the insertion work of the inflator 18 into the protrusion 20. In addition, the strength of the connection between the airbag 12 and the retainer 10 is quite high.

As shown in FIG. 8, a female thread 40 may be formed in the protrusion 20 and a bolt 42 is screwed into the female thread 40 to push up the inner plate 16 so as to press the both ends of the inflator 18 onto the concavities 22. By pressing the both ends of the inflator 18 onto the concavities 22 in the this manner, the backlash of the inflator 18 can be securely prevented. In the present invention, the female thread 40 and the bolt 42 can be omitted.

Though the concavities 22, 22, the upward projections 34, 34, and the slits 30, 30, which are all pair, are provided and the both ends of the inflator 18 are engaged with the concavities 22, 22 in the aforementioned embodiment, only one concavity 22, one upper projection 34, and one slit 30 may be provided and only one of the ends of the inflator 18 may be engaged with the concavity 22.

As mentioned above, according to the airbag mounting structure of the present invention, the stress exerted on the retainer from the airbag through the inflator during the actuation of the inflator can be small, thereby improving the bearing force of the retainer. The airbag is secured to the retainer by inserting the inflator into the protrusion from the side end of the retainer, thereby extremely facilitating the mounting work of the airbag.

What is claimed is:

1. An airbag mounting structure comprising:
 a retainer having a protrusion formed at a bottom thereof and protruding outward, and at least one concavity formed in the bottom thereof to be curved inwardly in a half-circular configuration coaxial with the protrusion and extending to a side face of the retainer, said protrusion extending in a longitudinal direction of the retainer and having an inflator-through hole in at least one of ends thereof in the longitudinal direction and a half-cylindrical configuration, an airbag having a portion inserted into the protrusion and at least one opening confronting the inflator-through hole, and an elongated inflator inserted into said portion of the airbag positioned inside the protrusion through the inflator-through hole of the retainer and the at least one opening of the airbag, and having a substantially cylindrical configuration and an end, said end being inserted through the inflator-through hole, projecting outside the protrusion and engaging the concavity at the bottom of the retainer so that the airbag is clamped between an inner surface of the protrusion and an outer surface of the inflator.

2. The airbag mounting structure as claimed in claim 1, wherein said retainer is provided with inflator-through holes which are formed at the ends of the protrusion thereof, respectively, and wherein the ends of the inflator are engaged with outer portions of the bottom of the retainer after passing through said inflator-through holes.

3. An airbag device having a retainer, an airbag folded and accommodated in the retainer, an inflator for generating gases for inflating the airbag and a lid covering the retainer, wherein the airbag and the inflator are mounted to the retainer according to claim 1.

4. An airbag mounting structure comprising:

a retainer having a protrusion formed at a bottom thereof and protruding outward, said protrusion extending in a longitudinal direction of the retainer and having an inflator-through hole in at least one of ends thereof in the longitudinal direction, an airbag having a portion inserted into the protrusion and at least one opening confronting the inflator-through hole, an elongated inflator inserted into said portion of the airbag positioned inside the protrusion through the inflator-through hole of the retainer and the at least one opening of the airbag, and having an end, said end being inserted through the inflator-through hole, projecting outside the protrusion and engaging an outside of the bottom of the retainer so that the airbag is clamped between an inner surface of the protrusion and an outer surface of the inflator, and an inner plate situated between the portion of the airbag corresponding to the protrusion and the outer surface of the inflator.

5. The airbag mounting structure as claimed in claim 4, wherein said inner plate has a projection curved along the outer surface of said inflator and a flange continuously extending from said projection in a direction apart from the inflator and wherein the airbag is clamped between said flange and the retainer.

6. The airbag mounting structure as claimed in claim 5, wherein said flange is provided with bolts, wherein said bolts are inserted through the airbag and the bottom of the retainer and are fastened with nuts.

7. The airbag mounting structure as claimed in claim 4, wherein said inner plate is made of a piece of plate such that a pair of slits is formed in the plate and a portion between said slits is pressed downwardly to make a portion to project in a half circle to form a downward projection which confronts the protrusion.

8. The airbag mounting structure as claimed in claim 7, wherein said inner plate is provided with upper projections by pressing upwardly portions positioned on end sides of said downward projection in a longitudinal direction to make the portions to project in a half circle and wherein a portion of said airbag is disposed between said upper projections and concavities of said retainer.

9. The airbag mounting structure as claimed in claim 8, wherein said concavity of said retainer has substantially the same radius of curvature of the outer periphery of the inflator.

10. The airbag mounting structure as claimed in claim 4, wherein said airbag has a pair of slits and wherein the inner plate is pressed onto a portion between said slits.

* * * * *